United States Patent Office 3,440,270
Patented Apr. 22, 1969

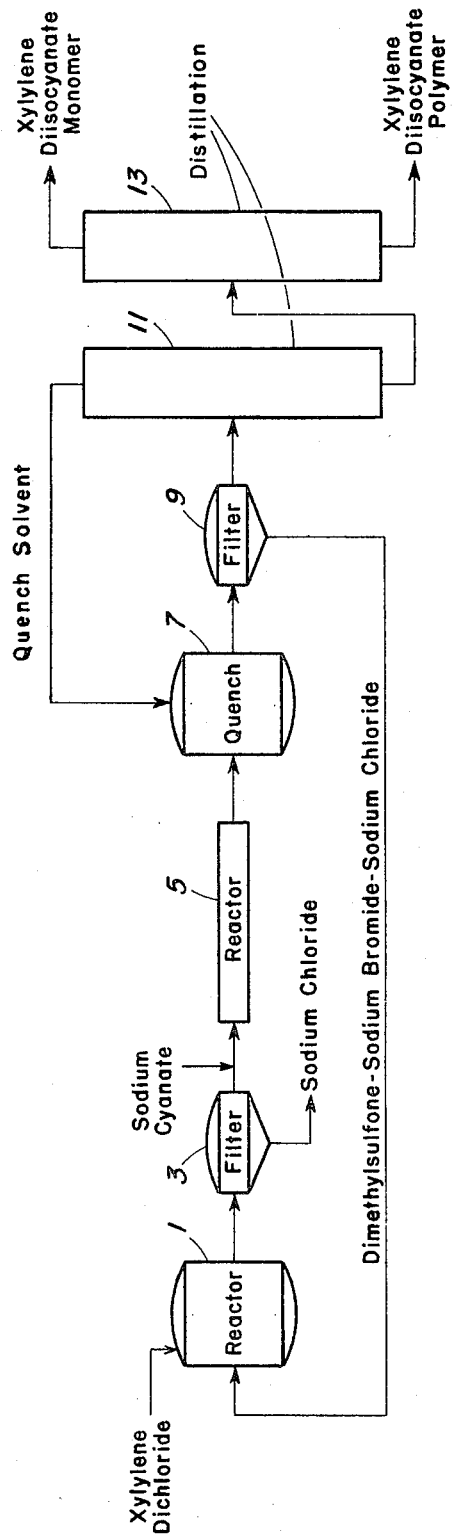

3,440,270
PREPARATION OF XYLYLENE DIISOCYANATE FROM XYLYLENE DICHLORIDE AND ALKALI METAL CYANATE USING A QUENCHING SOLVENT
Arnold L. McMaster, Lincoln Park, and Kenneth E. Davis, Taylor, Mich., assignors to Wyandotte Chemicals Corporation, Wyandotte, Mich., a corporation of Michigan
Filed Dec. 30, 1965, Ser. No. 517,613
Int. Cl. C07c 155/02
U.S. Cl. 260—453         7 Claims

ABSTRACT OF THE DISCLOSURE

The process for preparing monomeric meta-xylylene diisocyanate, para-xylylene diisocyanate, and mixtures thereof by reacting meta-xylylene dichloride, para-xylylene dichloride or mixtures thereof with sodium bromide in the presence of dimethyl sulfone, adding sodium cyanate, quenching the reaction resulting from the cyanate addition with a quenching solvent, removing dimethyl sulfone, sodium bromide, sodium chloride, and the quenching solvent from the resulting mixture and separating the monomeric xylylene diisocyanate from polymeric xylylene diisocyanate.

---

This invention relates to a novel method for the preparation of xylylene diisocyanate monomer.

It is known in the prior art that xylylene diisocyanate can be prepared by reacting xylylene dihalides with alkali metal cyanates using dimethyl sulfone as a reaction medium. However, such prior art process possesses certain inherent disadvantages since alkali metal cyanates are particularly effective catalysts for the polymerization of the xylylene diisocyanate and intermediate reaction products. The rate of reaction of xylylene dihalides with alkali metal cyanates in a dimethyl sulfone reaction medium is substantially slower than the rate of polymerization of the iscyanate products. Thus, this reaction produces essentially polymeric xylylene diisocyanate.

The use of xylylene dibromide in place of xylylene dichloride has been found to facilitate the rate of formation of xylylene diisocyanate monomer. However, xylylene dibromide is best prepared by the reaction of xylylene dichloride iwth sodium bromide and this reaction does not result in high conversions to xylylene dibromide because of an equilibrium reaction which is established. The preparation of xylylene dibromide by such method requires an efficient separation of the organic dibromide from an intermediate organic monobromide produced by the reaction and unreacted dichloride. Such separation is not readily effected within commercially practicable means.

Accordingly, it is a purpose of this invention to provide a novel, economical, and commercially feasible process for the production of meta- and para-xylylene diisocyanates from meta- and para-xylylene dichloride and, particularly, to provide a continuous method of production of meta- and para-xylylene diisocyanates wherein a high yield of xylylene diisocyanate monomer is obtained.

The above and other purposes of this invention are accomplished by providing a process for the preparation of monomeric xylylene diisocyanates selected from the group consisting of meta-xylylene diisocyanate, para-xylylene diisocyanate and mixtures thereof, comprising the steps of reacting xylylene dichloride selected from the group consisting of metal-xylylene dichloride, para-xylylene dichloride and mixtures thereof with sodium bromide in the presence of dimethyl sulfone, adding sodium cyanate, quenching the reaction resulting from the cyanate addition with a quenching solvent, removing dimethyl sulfone, sodium bromide, sodium chloride and the quenching solvent from the resulting mixture and separating monomeric xylylene diisocyanate from polymeric xylylene diisocyanate.

The expression "quenching solvent," as used herein, defines any solvent which is miscible in reasonable amount and nonreactive with the xylylene diisocyanate produced by the reaction. It is preferable that the quenching solvent have a lower boiling point than xylylene diisocyanate in order that it can be readily removed by distillation from the isocyanate. Preferred quenching solvents are chlorinated hydrocarbons as carbon tetrachloride, monochlorobenzene and dichlorobenzene.

It has been surprisingly discovered in accordance with this invention that advantage of the use xylylene dibromide with its greater and more efficient reactivity and resulting high yields of xylylene diisocyanate monomer may be obtained without the necessity of converting all of the xylylene dichloride to the bromide.

More particulraly, it has been discovered in accordance with this invention that it is possible to obtain high yields of xylylene diisocyanate monomer from the reaction of sodium cyanate with the intermediate mixture obtained from the reaction of xylylene dichloride with sodium dibromide wherein xylylene dichloride, an intermediate xylylene monobromide and xylylene dibromide are all present during reaction with the sodium cyanate even though xylylene dibromide itself is not the major constituent of the reaction mixture.

In the first step of the process, sodium bromide is reacted with the xylylene dichloride in the presence of dimethyl sulfone at a temperature from about 110° C. to 230° C. for a period of at least about 30 minutes. The amount of sodium bromide to be employed is determined by the equilibrium reaction and is chosen such that not more than a trace of unreacted sodium bromide is present in the mixture after reaction with xylylene dichloride is completed.

Upon completion of the reaction of the sodium bromide with the xylylene dichloride, sodium chloride precipitates out and is removed by filtration.

In carrying out the reaction with the sodium cyanate, preferably a temperature of about 150 to 230° C. is maintained. In a preferred embodiment, the sodium cyanate is less than 50-micron particle size. A slight excess of the sodium cyanate above the stoichiometric proportions is preferred although amounts of sodium cyanate up to about 20 percent excess may be employed. The preferred reaction time is about 15 seconds to 5 minutes.

Also, in a preferred embodiment of this invention, the weight ratio of dimethyl sulfone to xylylene dichloride is about 2.0/1 to 5.0/1 and the weight ratio of the quenching solvent to the xylylene dichloride reacted in the first step is about 5.0/1. Any amount of quenching solvent above this amount may be employed. The maximum amount of quenching solvent is a matter of economics, e.g., the cost of recirculating large amounts of quenching solvent. A suitable working maximum is about 50/1.

As a result of the quenching step, the dimethyl sulfone, sodium bromide and sodium chloride precipitate and are removed by filtration. The quenching solvent is then removed from the isocyanate by distillation and the monomeric xylylene diisocyanate separated from the polymeric xylylene diisocyanate by distillation.

While the process of this invention may be performed as a batch process, it is especially adaptable to use in a continuous process. When employed in such process, the dimethyl sulfone, sodium bromide and sodium chloride removed by filtration subsequent to the quenching step are recycled for reaction with the xylylene dichloride.

Since there is very little loss of sodium bromide and dimethyl sulfone in this process, the recycle provides practically all the dimethyl sulfone and sodium bromide needed for the reaction. Similarly, the inert quenching solvent which is removed by distillation is recycled for the quenching step and constantly reused with little makeup required. Acccordingly, dimethyl sulfone, sodium bromide and quenching solvent are added primarily at start-up of the continuous process with only small amounts, if any, of makeup added at widely spread intervals.

The continuous recycle process of this invention is best described with reference to the attached drawing which is a flow sheet illustrating a preferred practice of such continuous process of the present invention.

With reference now more particularly to the drawing, the xylylene dichloride is reacted with sodium bromide in reactor 1 in the presence of dimethyl sulfone at temperatures ranging from about 110° C. to 230° C. As previously pointed out, the amount of sodium bromide to be employed is determined by the equilibrium reaction and is chosen such that not more than a trace of unreacted sodium bromide is present in the mixture after reaction with the xylylene dichloride is complete. The resultant reaction mixture is then filtered in a conventional filter 3 to remove the sodium chloride. In general, this reaction is carried out batchwise in two or more reactors 1 wherein the feed for the filter 3 is alternately taken from each reactor 1 to provide continuous operation. The filter 3 is preferably a continuous type such as a continuous rotating drum vacuum filter or a continuous centrifuge.

At this stage the filtrate from the filtering step contains the equilibrium mixture of the xylylene chlorides and bromides in dimethyl sulfone.

Sodium cyanate of particle size less than 50 microns is then added to the filtrate and the reaction is allowed to proceed in a suitable heated reactor 5 and maintained at a temperature preferably about 160° C. to 220° C. A particularly suitable apparatus 5 for use in this continuous process is a tubular flow reactor which, in essence, is simply a jacketted pipe heat exchanger wherein the reaction mixture passes through the inner pipe and a heat exchange medium is passed counter-currently through the jacket of the pipe. Use of such tubular flow reactor tends to keep the finely divided sodium cyanate in suspension without the use of any specific agitating means and to maintain the exothermic reaction within the preferred temperature range.

In order to terminate the reaction and thus prevent excessive polymerization, the mixture is quenched by contacting it with a quenching solvent, such as those discussed above, in a quench tank 7. Immediately upon contact with the quenching medium, the dimethyl sulfone is crystallized to a fine solid containing the monomeric xylylene diisocyanate and the sodium bromide and chloride formed during reaction. The monomeric xylylene diisocyanate along with any polymeric materials formed is leached out of the dimethyl sulfone by the quench medium in the quench tank 7. Dimethyl sulfone, sodium bromide and sodium chloride are removed by filtering in a suitable filtering device 9 which is a conventional filtering apparatus, such as described above, with respect to filter 3. The dimethyl sulfone, sodium bromide and sodium chloride are then recycled to the reactor 1 for the reaction of the sodium bromide with xylylene dichloride.

The filtrate from filter 9 is subjected to a distillation operation in a conventional column 11 to remove the quenching solvent. The quenching solvent is then recycled in the system to the quench tank 7. The xylylene diisocyanate is subjected to distillation in a conventional column 13 wherein the xylylene diisocyanate monomer is removed from the high boiling polymeric material.

The continuous process of the invention, as described above, may be operated continuously by simply adding the xylylene dichloride to reactor 1 and sodium cyanate to reactor 5, all at the proper rate. Generally, an adequate amount of sodium bromide for the reaction in reactor 1 is provided from the recycle so that little or no sodium bromide need be added once the reaction begins and an adequate amount of quenching solvent for the quench tank 7 is generally provided by the quenching solvent recycled from the distillation column 11 such that little or no quenching solvent need be added after the beginning of the process.

The following examples further illustrate the practice of this invention.

EXAMPLE I 300 grams of dry dimethyl sulfone, 100 grams of metaxylylene dichloride, and 100 grams of dry sodium bromide are added to a two-liter flask and heated at 160–165° C. for 2 hours. 81.5 grams of sodium cyanate are then added and the mixture reacted for 5 minutes. The temperature rises to 175° C. during this time. The reaction is then quenched by the addition of 520 grams of ortho-dichlorobenzene, after which the mixture is cooled to room temperature and filtered. The filtrate is subjected to distillation to separate out the ortho-dichlorobenzene, followed by distillation to separate out the metaxylylene diisocyanate monomer. The yield is 69 percent metaxylylene diisocyanate monomer.

EXAMPLE II 1500 grams of dimethyl sulfone, 500 grams of xylylene dichloride (80 percent meta-, 20 percent para-isomer), 400 grams of sodium bromide, and 500 milliliters of toluene are added to a five-liter flask. A toluene-water azeotrope and toluene are distilled off to remove any traces of water. The temperature is then stabilized at 200° C. and 450 grams of sodium cyanate added to the flask. The temperature increases from 196° C. to 210° C. in about 45 seconds at which point two liters of ortho-dichlorobenzene are added to quench the reaction. The reaction mixture is then cooled to room temperature, filtered and the filtrate distilled to separate out ortho-dichlorobenzene, followed by distillation to separate out the xylylene diisocyanate monomer. A yield of 84 percent meta-para-xylylene diisocyanate monomer is obtained.

EXAMPLE III 1500 grams of dimethyl sulfone, 415 grams of sodium bromide, and one liter of toluene are added to a reaction flask. The mixture is then heated to distill off a toluene-water azeotrope and toluene. 500 grams of xylylene dichloride (80 percent meta-, 20 percent para-isomer) are then added and the temperature maintained at 110–130° C. for 1.5 hours. The temperature is then increased to 200° C. and 450 grams of sodium cyanate added. After 1 to 1½ minutes of reaction, two liters of ortho-dichlorobenzene are added to quench the reaction. The mixture is then cooled to room temperature and filtered. The filtrate is distilled to separate out the ortho-dichlorobenzene and the residual crude xylylene diisocyanate distilled to separate the monomer from the polymer. A yield of 83 percent meta-para-xylylene diisocyanate is obtained.

EXAMPLE IV 8 kilograms of dimethyl sulfone, 1.6 kilograms of xylylene dichloride (80 percent meta-, 20 percent para-isomer), and 1.6 kilograms of sodium bromide are added to a 12-liter flask and reacted for 4 hours at a temperature of 150° C. After cooling to 115° C., 1.2 kilograms of sodium cyanate are added. After mixing for 5 minutes, the mixture is started through a jacketted tube-type heat exchanger which comprises 60 feet of ½-inch stainless steel tubing, jacketted with ¾-inch pipe. 50 feet of the tubing is heated by circulating a heated eutectic mixture of diphenyl and diphenyl oxide, sold under the trademark Dowtherm, through the jacket and 10 feet is heated with steam passing through the jacket. Ten minutes is required to feed the material through the exchanger with the flow rate maintained constant. The material from the heat exchanger then passes into 38 gallons of carbon tetrachloride in a 50-gallon tank and the mixture with carbon tetrachloride is then filtered through a plate and frame-type filter. The filtrate is then passed to a still wherein the carbon tetrachloride is removed and the xylylene diisocyanate is then passed to a second still wherein the xylylene diisocyanate monomer is separated from the xylylene diisocyanate polymer. A yield of 70 percent meta-para-xylylene diisocyanate monomer is obtained.

EXAMPLE VI

This example illustrates the application of this invention to a continuous operation.

11.6 pounds of xylylene dichloride (80 percent meta-, 20 percent para-isomer) are added to 46.86 pounds of a recycle stream, comprised of 34.8 pounds of dimethyl sulfone, 9.43 pounds of sodium bromide, and 2.43 pounds of sodium chloride in a 5-gallon glass-lined vessel equipped with an agitator and heating jacket. The mixture is reacted for one hour at a temperature of 120–130° C.

The mixture is then discharged continuously through a heated (110–120° C.) filter at a rate of about 60 pounds per hour. The filter cake, which consists essentially of sodium chloride, is discarded. During discharge of the above mixture, xylylene dichloride (80 percent meta-, 20 percent para-isomer) is added to a recycle stream of dimethyl sulfone, sodium bromide, and sodium chloride in a second 5-gallon glass-lined vessel in the above amounts and reacted for one hour at a temperature of 120–130° C. When the reaction is complete, the second vessel is discharged to the filter and xylylene dichloride and the recycle stream reacted in the first reactor for one hour, as described above. By the use of a conventional valving arrangement the filter is alternately supplied from each of the vessels, thereby maintaining continuous operation.

The filtrate is passed continuously into an in-line mixer, which is maintained at 110–120° C. by external heating at a rate of 49.82 pounds per hour. Sodium cyanate of particle size less than 44 microns is added continuously at a rate of 8.65 pounds per hour to the in-line mixer from a feed hopper. The total residence time in the in-line mixer is about three minutes.

The resulting mixture is then passed continuously at a rate of 58.49 pounds per hour into a ½-inch diameter type 304 stainless steel tubular reactor, jacketted with ¾-inch pipe which is maintained at a temperature of 190–210° C. by means of a heated eutectic mixture of diphenyl and diphenyl oxide, sold under the trademark Dowtherm, circulating through the heating jacket. Total residence time in the reactor is about one minute.

The mixture from the tubular reactor flows into a 50-gallon quench vessel, equipped with an agitator and condenser, containing 38 gallons of carbon tetrachloride. The material from the quench vessel is filtered to remove the dimethyl sulfone, sodium bromide and sodium chloride. The filter cake is washed with an additional 7 gallons of carbon tetrachloride, and after suitable drying contains 33.99 pounds of dimethyl sulfone, 9.38 pounds of sodium bromide and 2.43 pounds of sodium chloride. After adding the required make-up for dimethyl sulfone and sodium bromide, the filter cake is recycled to the first stage of the process.

The filtrate is flash distilled to remove the carbon tetrachloride, which is then recycled in the system back to the quench vessel. The residue is distilled under vacuum to separate the xylylene diisocyanate monomer from the polymer. The process is run continuously for 10 hours and a total of 100 pounds of meta-para-xylylene diisocyanate monomer of 98–99 percent purity is obtained, corresponding to a yield of about 80 percent based on both xylylene dichloride and sodium cyanate.

It is to be understood that various changes and modifications may be made in the foregoing without departing from the spirit of the invention and scope of the appended claims.

What is claimed is:

1. A process for preparing monomeric xylylene diisocyanates selected from the group consisting of meta-xylylene diisocyanate, para-xylylene diisocyanate and mixtures thereof, comprising the steps of reacting xylylene dichloride selected from the group consisting of meta-xylylene dichloride, para-xylylene dichloride and mixtures thereof with sodium bromide at a temperature from about 110° C. to 230° C. for at least about 30 minutes, the amount of sodium bromide reacted with said xylylene dichloride being such that not more than a trace of unreacted sodium bromide is present after said reaction is completed, in the presence of dimethyl sulfone, adding sodium cyanate in an amount ranging from the stoichiometrically equivalent amount to about 20% in excess of the stoichiometrically equivalent amount, maintaining the reaction resulting from said cyanate addition at a temperature from about 150° C. to 230° C., quenching said reaction with a chlorinated hydrocarbon quenching solvent which is miscible and non-reactive with the xylylene diisocyanate produced by the reaction and having a lower boiling point than xylylene diisocyanate, removing dimethyl sulfone, sodium bromide and sodium chloride and said quenching solvent from the resulting mixture and separating said monomeric xylylene diisocyanate from polymeric xylylene diisocyanate.

2. A process as defined in claim 1 wherein said dimethyl sulfone, sodium bromide and sodium chloride removed subsequent to said quenching step are removed by filtration, said quenching solvetn is removed by distillation and said monomeric xylylene diisocyanate is removed from said polymeric xylylene diisocyanate by distillation.

3. The process of claim 2 wherein said process is continuous, sodium chloride is removed by filtration subsequent to said reaction of xylylene dichloride with sodium bromide and prior to said sodium cyanate addition, said dimethyl sulfone, sodium bromide and sodium chloride removed subsequent to said quenching step are recycled to said reaction of xylylene dichloride with sodium bromide and said quenching solvent removed subsequent to said quenching step is recycled to said quenching step.

4. A process as defined in claim 3 wherein the weight ratio of dimethyl sulfone to xylylene dichloride is about 2.0/1 to 5.0/1.

5. A process as defined in claim 4 wherein the weight ratio of said quenching solvent to said xylylene dichloride reacted in said first step is not less than about 5.0/1.

6. A process as defined in claim 5 wherein the weight ratio of said quenching solvent to said xylylene dichloride reacted in said first step is about 5.0/1 to 50.0/1.

7. The process of claim 1 wherein said quenching solvent is selected from the group consisting of carbon tetrachloride and chlorobenzenes.

References Cited

UNITED STATES PATENTS

| 2,866,801 | 12/1958 | Himel et al. | 260—453 |
| 2,866,802 | 12/1958 | Graham | 260—453 |
| 2,866,803 | 12/1958 | De Pree | 260—453 |
| 2,884,360 | 4/1959 | Bloom et al. | 260—453 X |
| 3,017,420 | 1/1962 | Schaeffer | 260—453 |

CHARLES B. PARKER, *Primary Examiner.*

S. T. LAWRENCE, III, *Assistant Examiner.*